United States Patent [19]

Notaras et al.

[11] 3,855,976
[45] Dec. 24, 1974

[54] APPARATUS FOR CONTROLLING THE QUALITY OF THE COMBUSTION AIR OF AN ENGINE

[76] Inventors: John Arthur Notaras; Angelo Lambrinos Notaras, both of 15-21 Reynold St., both of Balmain, New South Wales, Australia

[22] Filed: Oct. 10, 1973

[21] Appl. No.: 405,117

[52] U.S. Cl. .......... 123/41.62, 123/41.56, 123/41.7, 123/41.79
[51] Int. Cl. ............................................ F02f 1/34
[58] Field of Search ............ 123/41.56, 41.62, 41.7, 123/41.75, 41.79

[56] References Cited
UNITED STATES PATENTS
2,571,828 10/1951 Brezek ............................ 123/41.56
2,595,175 4/1952 Sonderegger ..................... 123/41.56
2,747,558 5/1956 Kiekhaefer ....................... 123/41.62
2,825,318 3/1958 Mansfield ......................... 123/41.56

Primary Examiner—Manuel A. Antonakas
Assistant Examiner—Daniel J. O'Connor
Attorney, Agent, or Firm—Emory L. Groff, Jr.

[57] ABSTRACT

An apparatus is provided for cleaning the combustion air of an air-cooled internal combustion engine and includes an air filter having a planar inlet surface over which a high velocity air stream is passed in a substantially parallel direction to permit a scouring effect sufficient to prevent foreign bodies carried by the air stream from accumulating on said inlet surface prior to passgae of the air stream carrying the foreign bodies over the cooling fins of the engine cylinder.

6 Claims, 4 Drawing Figures

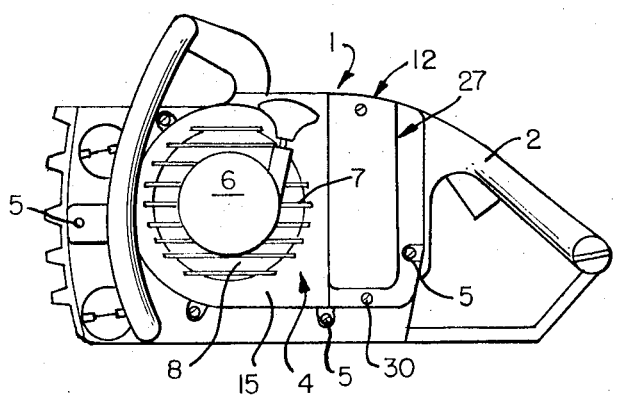
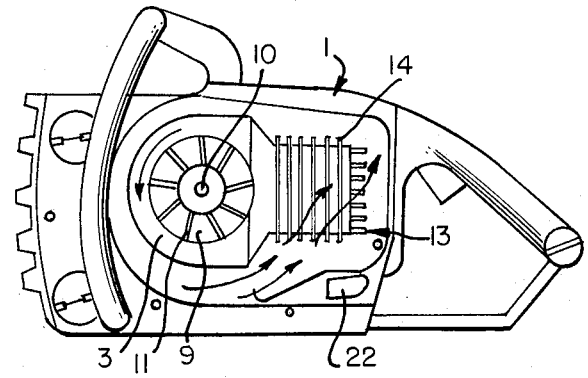
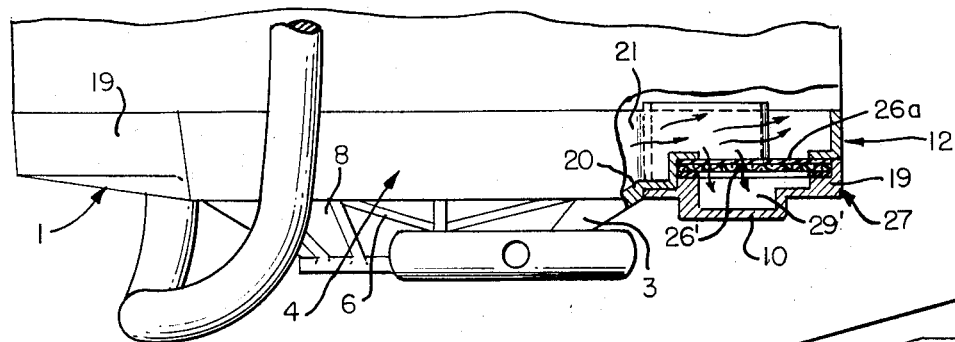
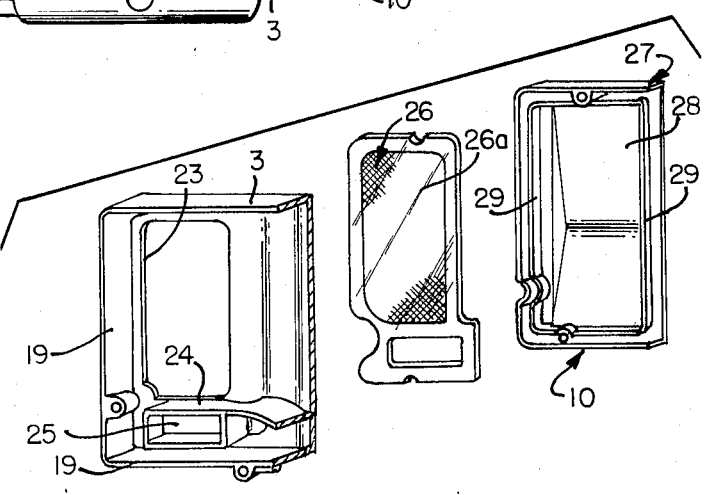

APPARATUS FOR CONTROLLING THE QUALITY OF THE COMBUSTION AIR OF AN ENGINE

This invention relates generally to air cleaning, and more particularly, to an apparatus whereby combustion air for an engine is provided in a cleaner condition than would be the case if conventional air cleaners were used. By conventional air cleaners are meant those devices whereby a block or cylinder of pervious material, either of the wet or dry type, is disposed in series, within the path of air as drawn from the atmosphere and directed into the carburetor inlet of an engine.

While the invention is applicable to internal combustion engines, in general, it has particular noteworthy application to those air-cooled engines which operate under conditions wherein the air is heavily charged with foreign bodies, for example, industrial dust, wood dust, grass cuttings, and the like. It is possible, in the case of chain saws for example, to produce tons of sawdust in a very short time. This sawdust, together with dust and dirt from the surrounding environment, small stones and bark, constitutes abrasive material which is a constant threat to the reliability and life span of small engines which are operated at very high revolutions to produce their power. A poorly fitted, unclean, broken or inefficient air cleaner of any type can reduce the life of an engine to only a few hours. This has been found from actual experience in using chain saws with conventional air-cleaning means in an extremely dusty environment. Many methods have been tried to obtain efficient air cleaning, but the only solution to date has been constant cleaning and care by the operator, most of who, unfortunately, neglect to give this care. One reason for lack of cleaning has been that prior air filters are enclosed or covered up within the apparatus and components of the apparatus have to be removed so that the air filter can be removed for cleaning or replacement.

The apparatus of the present invention significantly reduces the frequency of cleaning and noticeably facilitates any required cleaning or replacement of the filter by making it readily accessible. The most important feature of this invention is that a self-cleaning action is achieved whereby the high velocity air stream as generated for cooling the cylinder of the air-cooled engine is directed, in a substantially parallel sweeping or scouring manner, across the face of a planar filter medium disposed intermediate the engine fan and cylinder head. Thus, the same high velocity air flow as generated to cool the engine, is initially used to simultaneously supply filtered air to a carburetor inlet and to provide a positive self-cleaning action to a filter medium. This is contrary to many prior art devices, wherein the air for combustion is drawn through a filter which receives its air supply from the surrounding ambient atmosphere. It will thus follow, that with a filter drawing its air supply from a dust-laden ambient atmosphere, all such suspended dust particles will be sucked into the filter and either entrapped within the filter medium or sucked through the filter and into the engine cylinder inasmuch as the sole force acting on this air for combustion is a negative or suction force.

In the present arrangement of pre-cleaning the combustion air, a filter medium is selected with a porosity related to the size of the foreign bodies in the air within the area of use of the apparatus. The porosity, for example in the cutting of pine, need not be as fine as when cutting hardwoods, due to their respective large and fine wood dust size. Accordingly, it will be understood that the porosity of the filter medium will be related to the size of the foreign bodies in the air in the area of use.

In one specific embodiment, as applied to a chain saw, there is provided for the chain saw engine a removable cover which supports a recoil type starter unit for the engine by ribs which permit air to be sucked into the cover by a fan on the end of the crank shaft on the engine with the high velocity air thus generated being directed by the contour of the inner wall of the cover as a stream across or parallel to the inlet surface of a planar filter medium mounted in the cover. This cover also contains port means connecting the outlet surface of the filter medium to the inlet of a carburetor of the engine.

Accordingly, one of the objects of the present invention is to provide an improved air filter arrangement for an internal combustion engine including means providing for the automatic self-cleaning of the filter medium.

Another object of the present invention is to provide an air filter system for an air-cooled engine wherein the air stream generated for cooling the engine also supplies filtered air to the carburetor inlet and self-cleans the filter medium.

A further object of the present invention is to provide an air filter assembly for an engine including a planar filter medium disposed in a plane substantially parallel to an incoming flow of fan-generated air, which air supplies a carburetor inlet passage and also maintains a sweeping or scouring action across the inlet face of the filter medium to discourage the accumulation of foreign particles thereupon.

With these and other objects in view, which will more readily appear as the nature of the invention is better understood, the invention consists in the novel construction, combination and arrangement of parts hereinafter more fully described, illustrated and explained.

A preferred embodiment of the present invention is shown in the accompanying drawing, in which:

FIG. 1 is a side elevation of a chain saw engine unit according to the present invention.

FIG. 2 is a view similar to FIG. 1, with the cover and filter unit for the saw removed.

FIG. 3 is a fragmentary top plan view, partly in section, of the saw illustrated in FIG. 1 with the cover which houses the air cleaner for the engine combustion air separated from the saw.

FIG. 4 is a fragmentary exploded perspective view of the rear portion of the cover showing the air cleaner compartment, the housing therefor, and the air cleaning medium.

Similar reference characters designate corresponding parts throughout the several figures of the drawing.

Referring now to the drawing, particularly FIG. 1, the present invention will be understood to relate to an improved self-cleaning air filtration system for an internal combustion engine and is illustrated in the drawing as being incorporated in a chain saw, generally designated 1, having a frame 2, in which is mounted an internal combustion engine 3. Quite obviously, the specific apparatus which the internal combustion engine and the present air filtration system may be associated with is quite immaterial, and the illustration of the present chain saw is selected to serve as appractical example of the use of the present novel air filter.

The engine 3 is enclosed on one side by means of a cover 4, which is removably attached to the frame 2 by fasteners 5 and includes any suitable well-known recoil type starter unit 6, mounted on the cover by means of a plurality of ribs 7, providing therebetween a plurality of fresh air intake passages 8. The internal combustion engine 3 includes a rotary fan member 9 mounted upon the free end of a crank shaft 10, and which is provided with appropriately spaced and shaped blades 11 designed to produce a high velocity air flow upon operation of the engine by creating a suction through the intake passages 8. This causes air to be drawn from the ambient atmosphere and thence directed at a significantly high velocity toward the right hand end or rear of the chain saw beneath the cover 4, as will be described more in detail later.

As shown most clearly in FIG. 3, the cover 4 actually comprises a complete sub-assembly and contains all of the structures of the present unique air filtering system. The rear portion 12 of the cover when assembled in its mounted position upon the frame 2 will be seen to overlie the cylinder 13 of the of the engine. This cylinder is provided with a plurality of suitable cooling fins 14 between which is directed the air flow as generated by the rotating fan member 9 of the engine. This flow is insured in view of the configuration of the cover 4, which cover includes an outer wall 15 having a circumferential peripherial edge 19 providing for a sealing engagement throughout its extent with the side of the engine and frame of the chain saw. In this manner, it will be seen that the inner wall 20 of the cover is spaced outwardly from all juxtaposed structure to provide an air flow chamber 21 intermediate the cover inner wall 20 and engine components. By this arrangement, the high velocity air flow created by the rotating fan member 9 as it sucks air from the atomosphere through the intake passages 8, will be directed toward the rear 12 of the air flow chamber 21 and when reaching the rearwardmost limit thereof, will be urged toward the fins 14 of the engine cylinder 13 to cool same prior to subsequent ejection from the chain saw.

The carburetor (not shown) for the engine 3 receives its intake air through the inlet 22 (FIG. 2) which air is delivered in a filtered condition by means of the filter medium of the present invention as contained within the cover 4.

The outer wall 15 of the rear portion 12 of the cover is provided with a filter medium opening 23 disposed substantially within the vertical plane of the carburetor inlet port 22 formed in the engine 3. This opening 23 extends vertically from adjacent the top of the rear portion of the cover to a point juxtaposed the top chamber wall 24 of a horizontally disposed filtered air chamber 25 located adjacent the bottom peripheral edge 19 of the cover. Overlying the outer face of the filter medium opening 23, is a planar layer of suitable filtering medium 26. The plane of the filter medium 26 will be understood to be substantially parallel to the longitudinal center axis of the chain saw, however, suitable results have been obtained when this filter medium is angled inwardly toward the rear of the cover. In any case, it will be understood that the air flow as evidenced by the arrows shown in FIG. 3 of the drawing clearly convey the concept of a sweeping or scouring action of the high velocity air flow being directed across the planar face of the filter medium prior to passage of this air.

The exact composition of the filter medium 26, is not too critical and the porosity thereof is selected according to the previously described parameters, it being understood that since the air flow is substantially parallel to the planar face thereof and sweeps the inner surface 26a at a high velocity and in a scouring manner, that only a minimal thickness in the filter medium is necessary. This is contrary to the more conventional type filters wherein the suction created by the carburetor causes any particles contained in the ambient atmosphere to be drawn into the filter medium, thus necessitating a suitably thick filter medium to ensure entrapment of such particles. Once the desired porosity is selected for the subject filter medium 26, it is only necessary for this medium to be of sufficient thickness to maintain proper support across the opening 23. In the casae of a significantly fine-mesh synthetic cloth, for example, it may be necessary to back this up with a stiffer wire screen 26' in which case, such a wire screen would be placed in an overlying relationship to the outer surface of the fine-mesh cloth prior to the attachment of the filter housing, generally designated 27.

This filter housing 27 will be seen to comprise an outer wall 28 bounded by peripherial side walls 29 which cooperate to form an inlet passageway for filtered carburetor air. This housing 27 is adapted to overlie the outer face of the filter medium and is removably attached to the outer wall of the cover 4 in the area of the rear portion 12 by means of suitable fasteners 30, such that the inlet passageway 29', contained therein, will be understood to overlie the outer portion of both the filter medium and the outer opening to the horizontal filtered air chamber 25.

With the foregoing description in mind, the complete cycle of operation may now be readily understood.

Instantly upon the starting of the engine by means of the recoil starter 6, the rotating fan member 9 begins to direct a high velocity stream of air rearwardly within the confines of the peripheral edge 19 of the cover 4. This air passes in a substantially parallel manner over the inner face 26a of the filter medium prior to being directed by means of the endmost peripheral edge 19 towrd the engine cylinder fins 14. Since the carburetor inlet port 22 will at all times be creating a suction or negative pressure during the running of the engine 3, it will follow that this suction will be transmitted by means of the connected horizontal air chamber 25 as a constant negative pressure within the inlet passageway 29', formed between the filter housing wall 28 and the outereface or surface of the filter medium 26. Thus, air for carburation will be drawn from the sweeping air flow passing across the inner face of the filter medium and all undesired foreign particles will be blocked by this filter medium. Any such particles wich are drawn by the above suction force onto the inner face of the filter medium will be instantly scoured or swept away therefrom by the continual high velocity airflow passing thereacross and these particles will subsequently be directed with the passing air flow across the engine cylinder prior to being exited into the atmosphere along with the air flow as shown by the arrows in the upper portion of FIG. 3 of the drawing.

A suitable filter medium found to perform satisfactorily in most environments has been found to be one designed to exclude particles having a size in excess of approximately five microns, although this is not to be construed to be a strict size limitation. Any larger foreign particles within the air stream that are not carried past the filter medium by the momentum of the air stream, may be drawn by the aforementioned suction and tend to accumulate upon the inner surface of the planar filter medium since they can not pass through the filter. These particles will not remain thereon since they will be blasted or scoured from the filter surface by the subsequent air stream and/or by blows received from subsequent foreign bodies. It will be appreciated that a hard non-absorbent, non-stick filter medium is desirable to encourage the scouring action described. It has been found that felt type filter mediums have a tendency to retain particles slightly larger than the selected size and these may eventually choke the filter medium. Although the velocity of the air stream has been described as a "high velocity" flow, it will be appreciated that the exact velocity thereof is a matter of selection and depends upon several variable factors, e.g. fan shape and size, engine speed and dust particle size within the air stream.

We claim:

1. A self-cleaning air filtering apparatus in combination with an internal combustion engine having a fan mounted on the engine, said apparatus including a cover overlying said fan and a portion of the cylinder of said engine, said cover provided with an air intake adjacent said fan communicating with an air flow chamber within said cover extending toward said engine cylinder, said cover having an opening therethrough upstream from and adjacent said cylinder, a planar filter medium disposed over said cover opening, cover means overlying said filter medium and provided with a passageway communicating with a combustion air intake port of said engine whereby, air directed by said fan from said air intake through said air flow chamber to said engine cylinder sweeps across said planar filter medium in the direction of orientation of the planar filter to constantly scour foreign particles therefrom and direct them past said cylinder.

2. A self-cleaning air filtering apparatus according to claim 1 wherein, the entire exposed surface of said filter medium is subjected to the sweeping action of said air flow.

3. A self-cleaning air filtering apparatus according to claim 1 wherein, said cover means comprises a removable housing having said passageway therein.

4. A self-cleaning air filtering apparatus according to claim 1 wherein, said filter medium comprises a non-stick material excluding particles in excess of five microns.

5. A self-cleaning air filtering apparatus according to claim 1 wherein, said filter medium comprises a thin fine-mesh layer backed up by a coarser more rigid supporting layer.

6. A self-cleaning air filtering apparatus according to claim 1 wherein, said cover includes a chamber for filtered air communicating with said passageway and said combustion air intake port.

* * * * *